UNITED STATES PATENT OFFICE 2,357,283

PROCESS FOR THE PRODUCTION OF N ALKYLOL AMIDES

Franklin Traviss Peters, Wilmington,, Del., assignor to E. I. du Pont de Nemours & Company, Wilmington, Del., a corporation of Delaware No Drawing. Application June 2, 1942, Serial No. 445,485

18 Claims. (Cl. 260—561)

This invention relates to improvements in the manufacture of N-alkylolamides, and particularly to the manufacture of N-alkylolamides of the lower aliphatic acids.

It is an object of this invention to prepare N-alkylolamides of lower aliphatic carboxylic acids. Another object is to prepare lower aliphatic amides substituted in the N- position by an alkylol group, without the intermediate use of an amine. A further object is to prepare N(beta-hydroxyethyl) amides of formic acid. Yet another object is to prepare N(beta-hydroxyethyl) formamides by a catalytic process. A still further object is to accomplish a general advance in the art.

These and other objects hereinafter apparent are accomplished according to this invention which provides a process for the production of N-alkylolamides wherein a carboxylic acid amide containing at least one amido-hydrogen atom is subjected to reaction with an alkylene oxide.

Preferably, the alkylene oxide is employed in an amount not greater than about that which is chemically equivalent to the amido-hydrogen atoms, since it has been found that undesired formation of by-products is thereby suppressed.

In one preferred embodiment, the present invention comprises admixing an alkylene oxide with a formamide containing at least one amido-hydrogen atom, and subjecting the resulting mixture to reaction to produce an N-alkylol formamide.

It has been discovered that when an alkylene oxide is reacted with a carboxylic acid amide at a temperature below that at which substantial formation of polyglycol derivatives takes place, extremely high yields of N-alkylol amides, approaching quantitative proportions, are readily attained. In general a reaction temperature not higher than about 80° C. has been found suitable for the production of N-alkylol amides in the practice of this invention. On the other hand, a reaction temperature sufficiently high to secure a rapid production of N-alkylolamides is usually preferred in the hereindescribed reaction, since it has been found that greatly lowering the reaction temperature retards the chemical reaction rate to an undesired extent. A temperature of at least about 35° C. provides a practical reaction rate in the present invention. Preferably, a temperature in the more restricted range of between about 50° C. and about 75° C. is maintained during the reaction of alkylene oxides with carboxylic acid amides containing at least one amido-hydrogen atom in accordance with this invention.

Although the reaction of alkylene oxides with carboxylic acid amides containing at least one amido-hydrogen atom may be carried out under elevated or reduced pressures, it is generally preferred to conduct the reaction under normal atmospheric pressure, since a suitable reaction rate is obtained and equipment is thereby simplified.

As hereinbefore stated, this invention contemplates the reaction of alkylene oxides with carboxylic acid amides containing at least one amido-hydrogen atom. Suitable alkylene oxides for reaction include ethylene oxide, propylene oxide, butylene oxide and similar epihydrins containing the epoxide linkage, such as glycidol. Ethylene oxide constitutes a preferred alkylene oxide for use in this invention, and its employment will hereinafter be detailed at greater length. However, any epihydrin capable of reacting with an amido-hydrogen atom is within the purview of this invention.

By the expression "carboxylic acid amides containing at least one amido-hydrogen atom," is intended such organic chemical substances as contain the structural nucleus

that is, a hydrogen atom is directly bonded to a nitrogen atom, which is in turn directly bonded to a carbonyl group.

Although any carboxylic acid amide containing at least one amido-hydrogen atom may be reacted in accordance with this invention, a preferred class of carboxylic acid amides comprises those carboxylic acid amides containing at least one amido-hydrogen atom and which are derived from carboxylic acids of not more than four carbon atoms. Examples of suitable amides are the amides of formic, acetic, glycollic, propionic, crotonic, lactic, butyric, isobutyric, and hydroxyisobutyric acids and their mono-N-substitution products, such as the N-methyl-, N-ethyl-, N-propyl-, N-hydroxyethyl-, N-hydroxypropyl-, N-methoxyethyl-, N-phenoxyethyl-, and N-methoxymethoxyethyl- substitution products of the foregoing amides, as well as other N-alkyl-, N-aryl-, N-aroyl-, N-hydroxyalkyl- and N-alkoxyalkyl- monosubstitution products thereof, provided that the amides contain at least one amido-hydrogen atom. Of the preferred class of amides containing at least one amido-hydrogen atom and derived from a carboxylic acid of not more than four carbon atoms, formamide is an outstanding example, and it has been demonstrated to possess peculiarly advantageous properties, described below, for reaction with alkylene oxides in the practice of this invention. Formamide is unique in that it reacts rapidly and substantially quantitatively with alkylene oxides, especially ethylene oxide, to produce N-alkylol formamides, such as N(beta-hydroxyethyl) formamide and N-bis(beta-hydroxyethyl) formamide, the said reaction with formamide requiring no extraneous solvent.

In the reaction of alkylene oxides with amides containing at least one amido-hydrogen atom, it has been found that the alkali metals, such as sodium, potassium, and lithium, act as catalysts for the reaction. The alkali catalyst is preferably employed in the form of its reaction product with an organic acid amide, usually the same amide as the one to be reacted with the alkylene oxide, although other amides can be used. The alkali metal reaction products with alcohols can likewise be used as catalysts if desired, in place of the amide-reaction products.

Suitable alkali metal compounds for use as catalysts embrace the reaction products of metallic sodium, potassium, lithium and other alkali metals with amides such as formamide, carbamide, acetamide, propionamide and similar amides as well as with alcohols, such as the sodium, potassium and lithium alcoholates derived from methanol, ethanol, propanol, isopropanol, butanol, isobutanol, and similar mono- and polyhydric alcohols.

Although the use of an alkali metal catalyst enhances the yield and speed of reaction as above described it has been found that foramide, the preferred amide for reaction according to this invention, reacts with an alkylene oxide to produce an alkylol formamide in the absence of a catalyst and also in the absence of extraneous solvent. This is indeed unexpected since many other amides are preferably reacted in the presence of both a solvent and a catalyst in order to hasten the rate of reaction.

In carrying out the reaction of an amide with an alkylene oxide in this invention, it has been found that an organic solvent for the amide to be reacted is desirable when the said amide is not in the liquid state under the reaction conditions. Suitable organic solvents for the amide reactant include alcohols, ethers, hydrocarbons and other organic compounds capable of dissolving amides under the reaction conditions, such as, for example, dimethyl foramide, methanol, ethanol, propanol, isobutanol, benzene, dioxane, petroleum ether, and the like. Lower aliphatic alcohols, especially methanol and ethanol, are the preferred solvents. While an organic solvent is desirable in the reaction of amides containing at least one amido-hydrogen atom with alkylene oxides, the reaction of said amides is preferably carried out in the absence of a solvent when the amides are normally liquid at the reaction temperatures employed. Thus, formamide is preferably reacted with alkylene oxides in the absence of extraneous solvent; a decided advantage.

In general, the reaction of an amide containing at least one amido-hydrogen atom is preferably carried out under anhydrous conditions, because water has been found to have a detrimental effect upon yields, and it also reacts with the alkali catalyst when a catalyst is employed.

In carrying out the present invention, when employing an alkali metal catalyst, the metallic catalyst is admixed with the amide to be reacted (after the amide has been dissolved in an organic solvent if a solvent is used), and the alkali metal is dissolved and simultaneously reacted with the amide or amide-solvent mixture until hydrogen is no longer evolved. The resulting mixture contains alkali metal-amide reaction product which serves as the active catalyst. When an alcohol is used as a solvent, some alkali alcoholate may be formed.

After hydrogen evolution has ceased, the alkylene oxide is passed into the amide-catalyst-solvent mixture above obtained at such a rate that the exothermic heat of reaction maintains the desired reaction temperature, cooling means being employed if necessary. When the reaction is completed, the alkali metal catalyst is neutralized, preferably with dry hydrogen chloride. The reaction mixture can then be separated into its components by distillation under reduced pressure or by other means.

The following examples, in which parts are by weight unless otherwise designated, illustrate the practice of the invention without, however, limiting it thereto:

*Example 1.*—Forty-five parts of anhydrous formamide are placed at room temperature in a reaction vessel provided with heating and cooling means, means for stirring the reactants, and a reflux condenser which may be cooled to 0° C. To the formamide, there is added 2.3 parts of metallic sodium the addition being in small portions. Hydrogen is evolved, and after hydrogen evolution has ceased, ethylene oxide is passed into the reaction mixture by means of an inlet tube extending under the surface of the liquid. Stirring is commenced, and the temperature of the reaction mixture rises to about 60° C. Thereafter, the rate of ethylene oxide addition is adjusted so that the temperature is maintained in the range of 60–70° C. In all, 22 parts ethylene oxide is added. After refluxing in the condenser has ceased, the reaction is completed, and gaseous hydrogen chloride is bubbled through the reaction mixture until it is neutral. The sodium chloride which precipitates is filtered off and the mixture is then placed in a still having an L shaped tubulated column. Twenty-six parts of unreacted formamide is recovered by distillation under reduced pressure, and 29 parts N-beta-hydroxyethyl formamide is obtained by distillation of the residue at 175° C. to 182° C. under 10 mm. absolute pressure. The final residue, consisting of 9.5 parts, is N-bis(beta-hydroxyethyl)-formamide.

*Example 2.*—Metallic sodium (2.3 parts) is dissolved in 160 parts of absolute alcohol. To this is added 59 parts of anhydrous acetamide, and the resulting solution is placed in a reaction vessel of the type described in Example 1. Eighty parts of ethylene oxide is bubbled through the acetamide-alcohol mixture in a manner similar to that described in Example 1. After the ethylene oxide has all been added, the mixture is neutralized with concentrated hydrochloric acid. Sodium chloride precipitates and is filtered off. Volatile material is removed by distillation, first at atmospheric pressure, and then at reduced pressure. After unreacted acetamide is removed by distillation under reduced pressure, 74 parts of a light-yellow liquid remains as a residue. This comprises a mixture of N-beta-hydroxyethyl acetamide and N-bis(beta-hydroxyethyl) acetamide in about equal parts by weight.

*Example 3.*—By reacting 44 parts of ethylene oxide with 59 parts of N-methyl formamide by the process described in Example 1, N-methyl, N-beta-hydroxyethyl foramide is obtained.

*Example 4.*—Butylamide (87 parts) is reacted with propylene oxide (104 parts) by the process described in Example 2. In this case the alkylene oxide is introduced into the alcoholic solution of the butyramide as a 50% solution in alcohol. The reaction product, after removal of unreacted alkylene oxide and butyramide by distillation, is a mixture comprising N-propylol butyramide and N-bis(propylol) butyramide.

The preferred catalyst is the sodium substitution product of the amide used as a reactant. A concentration of catalyst corresponding to about 1 to 10 mole percent based on the amide reactant is preferred under anhydrous conditions. Increase in the concentration of catalyst results in an increase in the rate of reaction.

While it is preferred to utilize the alkylene oxide in a ratio of not greater than about chemically equivalent proportions to the amide, the proportion of alkylene oxide is subject to some variation. When the amide reactant has two amido-hydrogen atoms, the preferred ratio of reactants varies with the degree of substitution desired; at a ratio of amide reactant to alkylene oxide reactant of 1:1, the amounts of mono- and di-substitution are about equal. With ratios less than this, di-substitution predominates. If, therefore, it is desired to have the substitution of only one amido-hydrogen atom predominate, the preferred ratio of reactants is about two mols of amide to one of alkylene oxide, that is, about twice the amount of amide theoretically necessary for the reaction, and the excess amide reactant is recovered by distillation after the reaction is completed.

As previously stated, formamide is the preferred amide for reaction. Formamide not only requires no solvent for reaction in accordance with this invention, but contrary to the amides of other aliphatic acids, the reaction is highly exothermic and proceeds at greater speed.

Preferably, the alkylene oxide is gradually added to the amide reactant rather than the reverse. This provides an excess of amide reactant during the addition, which permits the predomination of mono-substitution of an amide reactant containing two amido-hydrogen atoms. While the products of the invention may be separated by distillation, preferably under reduced atmospheric pressure, for many uses it is unnecessary to separate the N-alkylol-amides from each other, the removal of any unreacted initial material being sufficient purification.

The N-alkylolamides are stable, high-boiling materials which are very soluble in water. They are particularly useful as softeners for regenerated cellulose, as described in U. S. Patent No. 2,170,845.

It will be apparent from the foregoing description that a novel and convenient method for the production of N-alkylol-amides in high yield and with but slight formation of by-products has been provided.

Various changes may be made in the details and practice of the invention without departing from the spirit and scope thereof.

I claim:

1. In a process for the production of N-alkylol amides, the steps which comprise admixing an anhydrous formamide containing at least one amido-hydrogen atom with ethylene oxide, and subjecting the resulting mixture to reaction under anhydrous conditions.

2. A process for N-alkylol amide production which comprises subjecting to reaction at a temperature between about 50° C. and 75° C. an anhydrous mixture of formamide with an amount of ethylene oxide not more than about that which is chemically equivalent to the amido-hydrogen atoms, in the presence of an alkaline catalyst comprising sodium formamide.

3. The process which comprises adding about 2.3 parts by weight of metallic sodium to about 45 parts by weight of anhydrous formamide, separating evolved hydrogen, introducing about 22 parts by weight of ethylene oxide into the reaction mixture thus formed while maintaining the temperature at 60–70° C., neutralizing the reaction mixture with dry hydrogen chloride gas, separating the precipitated sodium chloride, and thereafter subjecting the reaction mixture to distillation at reduced pressure to recover about 29 parts by weight of N-beta-hydroxyethyl formamide and about 9.5 parts by weight of N-bis(beta-hydroxyethyl)-formamide.

4. The process which comprises adding about 59 parts by weight of anhydrous acetamide to a solution of about 2.3 parts by weight of metallic sodium in about 160 parts by weight of absolute alcohol, introducing about 80 parts by weight of ethylene oxide into the solution thus formed, neutralizing the reaction mixture with concentrated hydrochloride acid, separating the precipitated sodium chloride, and thereafter subjecting the reaction mixture to distillation at reduced pressure to recover as a residue a mixture of N-beta-hydroxyethyl acetamide and N-bis(beta-hydroxyethyl) acetamide in about equal parts by weight.

5. The process which comprises adding about 87 parts by weight of butyramide to a solution prepared by dissolving about 2.3 parts by weight of metallic sodium in about 160 parts by weight of absolute alcohol, introducing into the solution thus formed about 104 parts by weight propylene oxide dissolved in an equal weight of absolute alcohol, submitting the mixture to reaction at a temperature between about 50° C. and about 75° C., neutralizing the reacted mixture, and recovering by distillation a mixture of N-propylol butyramide and N-bis(propylol) butyramide.

6. A process for N-alkylol amide production which comprises subjecting to reaction in the presence of an alkaline catalyst, under anhydrous conditions at a temperature of at least 35° C. but below that at which substantial formation of polyglycol derivatives takes place, a mixture of a carboxylic acid amide containing at least one amido-hydrogen atom with an alkylene oxide.

7. A process for N-alkylol amide production which comprises subjecting to reaction in the presence of an alkaline catalyst, under anhydrous conditions at a temperature of at least 35° C. but not higher than about 80° C., a mixture of a carboxylic acid amide containing at least one amido-hydrogen atom with an amount of an alkylene oxide not more than about that which is chemically equivalent to the amido-hydrogen atoms.

8. A process for N-alkylol amide production which comprises subjecting to reaction, under anhydrous conditions at a temperature between about 50° C. and about 75° C., a mixture of a carboxylic acid amide containing at least one amido-hydrogen atom with an alkylene oxide in the presence of an organic solvent for said amide and an alkaline catalyst selected from the group consisting of the compounds of alkali metals with amides and the compounds of alkali metals with alcohols.

9. A process for N-alkylol amide production which comprises subjecting to reaction, under anhydrous conditions at a temperature of at least 35° C. but not higher than about 80° C., a mixture of a carboxylic acid amide containing at least one amido-hydrogen atom with an amount of an alkylene oxide not more than about that which is chemically equivalent to the amido-hydrogen atoms in the presence of an organic solvent for said amide and an alkaline substance selected from the group consisting of the compounds of alkali metals with amides and the compounds of alkali metal with alcohols.

10. A process for N-alkylol amide production which comprises subjecting to reaction an anhydrous mixture of a carboxylic acid amide containing at least one amido-hydrogen atom and not more than four carbon atoms in the carboxylic acid residue with an alkylene oxide in the presence of an alkaline substance selected from the group consisting of the compounds of alkali metals with amides and the compounds of alkali metals with alcohols.

11. A process for N-alkylol amide production which comprises subjecting to reaction, at a temperature not higher than about 80° C., an anhydrous mixture of a carboxylic acid amide containing at least one amido-hydrogen atom and not more than four carbon atoms in the acyl radical, with an amount of an alkylene oxide not more than about that which is chemically equivalent to the amido-hydrogen atoms, in the presence of an alkaline substance selected from the group consisting of the compounds of alkali metals with amides and the compounds of alkali metals with alcohols.

12. A process for N-alkylol amide production which comprises subjecting to reaction an anhydrous mixture of a carboxylic acid amide containing at least one amido-hydrogen atom and not more than four carbon atoms in the carboxylic acid residue with an alkylene oxide, in the presence of an organic solvent for the said amide and an alkaline substance selected from the group consisting of the compounds of alkali metals with amides and the compounds of alkali metals with alcohols.

13. A process for N-alkylol amide production which comprises subjecting to reaction at a temperature not higher than about 80° C., an anhydrous mixture of a carboxylic acid amide containing at least one amido-hydrogen atom and not more than four carbon atoms in the acyl radical with an amount of an alkylene oxide not more than about that which is chemically equivalent to the amido-hydrogen atoms, in the presence of an organic solvent for the said amide and an alkaline substance selected from the group consisting of the compounds of alkali metals with amides and the compounds of alkali metals with alcohols.

14. A process for N-alkylol amide production which comprises subjecting to reaction at a temperature between about 35° C. and about 75° C. an anhydrous mixture of a carboxylic acid amide containing at least one amido-hydrogen atom and not more than four carbon atoms in the carboxylic acid residue with ethylene oxide, in the presence of an alkaline substance selected from the group consisting of the compounds of alkali metals with amides and the compounds of alkali metals with alcohols.

15. A process for N-alkylol amide production which comprises subjecting to reaction at a temperature between about 50° C. and about 75° C. an anhydrous mixture of a carboxylic acid amide containing at least one amido-hydrogen atom and not more than four carbon atoms in the carboxylic acid residue with an amount of ethylene oxide not more than about that which is chemically equivalent to the amido-hydrogen atoms, in the presence of an organic solvent for the said amide and an alkaline substance selected from the group consisting of the compounds of alkali metals with amides and the compounds of alkali metals with alcohols.

16. In a process for the production of N-alkylol amides, the steps which comprise admixing formamide with an alkylene oxide, and subjecting the resulting mixture to reaction under anhydrous conditions at a temperature between 35 and 75° C.

17. A process for N-alkylol amide production which comprises subjecting to reaction at a temperature not higher than about 80° C. an anhydrous mixture of a formamide containing at least one amido-hydrogen atom with an amount of an alkylene oxide not more about that which is chemically equivalent to the amido-hydrogen atoms, in the presence of an alkaline substance selected from the group consisting of the compounds of alkali metals with amides and the compounds of alkali metals with alcohols.

18. A process for N-alkylol amide production which comprises subjecting to reaction at a temperature between about 35° C. and about 75° C. an anhydrous mixture of a formamide containing at least one amido-hydrogen atom with an amount of ethylene oxide not more than about that which is chemically equivalent to the amido-hydrogen atoms, in the presence of an alkaline substance selected from the group consisting of the compounds of alkali metals with amides and the compounds of alkali metals with alcohols.

FRANKLIN TRAVISS PETERS.